(12) United States Patent
Larsson et al.

(10) Patent No.: US 9,715,019 B2
(45) Date of Patent: Jul. 25, 2017

(54) DETERMINING A RELATIVE POSITION BETWEEN DEVICES

(71) Applicant: Sony Mobile Communications Inc., Tokyo (JP)

(72) Inventors: Bo Larsson, Malmö (SE); Kåre Agardh, Rydebäck (SE); Magnus Persson, Lund (SE); Peter Karlsson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/949,371

(22) Filed: Nov. 23, 2015

(65) Prior Publication Data
US 2017/0045627 A1    Feb. 16, 2017

Related U.S. Application Data (63) Continuation of application No. PCT/EP2015/068753, filed on Aug. 14, 2015.

(51) Int. Cl.
| | |
|---|---|
| H04W 24/00 | (2009.01) |
| G01S 19/51 | (2010.01) |
| H04W 4/02 | (2009.01) |
| G01S 3/48 | (2006.01) |
| H04B 7/08 | (2006.01) |

(52) U.S. Cl.
CPC ............ *G01S 19/51* (2013.01); *G01S 3/48* (2013.01); *H04B 7/08* (2013.01); *H04W 4/023* (2013.01)

(58) Field of Classification Search
USPC ....................................... 455/456.1
See application file for complete search history.

(56) References Cited

U.S. PATENT DOCUMENTS

| | | | |
|---|---|---|---|
| 2008/0316105 A1 | 12/2008 | Seong et al. | |
| 2010/0009644 A1 | 1/2010 | Izumi et al. | |
| 2014/0113652 A1* | 4/2014 | Maguire | G01S 5/0289 455/456.1 |
| 2015/0087331 A1 | 3/2015 | Yang et al. | |

(Continued)

FOREIGN PATENT DOCUMENTS

| | | |
|---|---|---|
| EP | 2 725 380 A1 | 4/2014 |
| WO | WO 2009/126416 A1 | 10/2009 |

OTHER PUBLICATIONS

International Search Report and Written Opinion Corresponding to International Application No. PCT/EP2015/068753; Date of Mailing: Apr. 22, 2016; 12 Pages.

*Primary Examiner* — William D Cumming
(74) *Attorney, Agent, or Firm* — Myers Bigel, P.A.

(57) ABSTRACT

Methods and devices for determining a relative position between a first device and a second device are described. Measurement signals are transmitted from the first device to the second device. Each measurement signal is associated with a corresponding radio frequency spectrum in which the measurement signal is transmitted. A first radio frequency spectrum associated with a first measurement signal has a different frequency range than a second radio frequency spectrum associated with a second measurement signal of the plurality of measurement signals. At the second device the relative position based on at least the first and second measurement signals is determined.

10 Claims, 3 Drawing Sheets

(56) References Cited

U.S. PATENT DOCUMENTS

2016/0377729 A1\* 12/2016 Jardak .................... G01S 19/29
                                                            342/357.27
2017/0045627 A1\* 2/2017 Larsson ................ H04W 4/023

\* cited by examiner

| B0 | B1 | B2 | B6 | B7 | B8 | B11 | B12 | B15 | B16 | B23 | B24 | B39 |
|---|---|---|---|---|---|---|---|---|---|---|---|---|
| Status Indication | | Value | | Reserved | Number of Bursts Exponent | | Bursts Duration | | Min Delta FTM | | Partial TSF Timer | |

| B40 | B41 | B42 | B43 | B47 | B48 | B49 | B50 | B55 | B56 | B71 |
|---|---|---|---|---|---|---|---|---|---|---|
| Reserved | ASAP Capable | ASAP | FTMs per Burst | | Reserved | | FTM Format and Bandwidth | | Burst Period | |

DETERMINING A RELATIVE POSITION BETWEEN DEVICES

CROSS REFERENCE TO RELATED APPLICATION

This application is a continuation of PCT International Application No. PCT/EP2015/068753, filed on Aug. 14, 2015, the disclosure and content of which is incorporated by reference herein in its entirety.

FIELD OF THE INVENTION

The present invention relates to a method for determining a relative position between a first device and a second device, and devices, in particular mobile devices, configured to perform such method. Embodiments of the present invention relate in particular to determining a relative position between devices based on a direct device-to-device communication.

BACKGROUND OF THE INVENTION

The market for positioning sensors, presence and proximity functions in mobile and wearable devices is significantly growing. For example, today a lot of smart phones include multiple positioning technologies such as GPS and Wi-Fi which provide a more or less accurate geographic position of the devices, for example latitude, longitude and altitude. This position information may be used by a plurality of applications including for example applications for monitoring and supporting sports activities and social networking applications.

These positioning technologies are rapidly improving in position accuracy, speed and power consumption. Furthermore, use cases are extending and a significant use case domain to be addressed may be the peer-2-peer positioning. This allows a determination of the relative position between two or more devices, which opens new device functionalities and new user behaviour.

Technologies for determining a distance and a direction from one device to another device include for example a line time measurement (FTM) and a measurement of angle of arrival/departure (AoA/AoD). The fine time measurement is used to determine the distance between two devices by measuring the time it takes for radio waves to propagate between the two devices. The angle of arrival/departure measurement is used to determine a direction for one device towards another device Usually, multiple antennas are used (synthetic antenna arrays are also usable) and the direction is derived from a comparison between the times when a transmitted signal arrives at each antenna. Variations of these two technologies are implemented in standards like WLAN, BLUETOOTH® and 3GPP machine type communication (MTC).

The accuracy of these technologies highly depends on the characteristics of the environment, for example the amount of multipath propagation, and the radio frequency characteristics of a wireless protocol, for example a modulation type and a bandwidth. However, the bandwidth may be very limited, for example in WLAN/Wi-Fi as a baseline uses 20 MHz channels, where each network is always set on one specific channel.

Therefore, there is a need in the art for methods and devices which address at least some of the above short comings in fine time measurements and angle of arrival/departure measurements. There is in particular a need in the art to improve the accuracy of these measurements within the limits of the standardized protocols, for example, WLAN, BlUETOOTH® and 3GPP.

SUMMARY OF THE INVENTION

According to the present invention, these objects are achieved by a method for determining a relative position between a first device and a second device as defined in claim 1, a device as defined in claim 14, and a device as defined in claim 15. The dependent claims define preferred and advantageous embodiments of the present invention.

According to an embodiment of the present invention, a method for determining a relative position between a first device and a second device is provided. The method comprises the following steps. A plurality of measurement signals are wirelessly transmitted from the first device to the second device. Each measurement signal of the plurality of measurement signals is associated with a corresponding radio frequency spectrum, in which the measurement signal is transmitted. A first radio frequency spectrum which is associated with a first measurement signal of the plurality of measurement signals has a different frequency range than a second radio frequency spectrum which is associated with a second measurement signal of the plurality of measurement signals. For example, each radio frequency spectrum, with which a corresponding one of the measurement signal is associated, has a different frequency range than any other radio frequency spectrum of the other measurement signals. Based on at least the first measurement signal and the second measurement signal, the relative position is determined at the second device. For example, each radio frequency spectrum, which is associated with a measurement signal, may have a bandwidth of for example 20 MHz, 40 MHz, 80 MHz or 160 MHz. However, the centre frequencies of the frequency spectrums may vary largely in a frequency band from 2.4 GHz to 2.5 GHz or from 5.1 GHz to 5.8 GHz of for example a WLAN standard. In particular, the first radio frequency spectrum may have a centre frequency at 2412 MHz and the second radio frequency spectrum may have a centre frequency of 2472 MHz. Therefore, the bandwidth of the signals used for measuring the relative position may be increased and therefore, the accuracy of positioning may be improved.

According to an embodiment, the first radio frequency spectrum is frequency-wise separated from the second radio frequency spectrum. For example, the radio frequency spectrums which are associated with each corresponding measurement signal may have a bandwidth of 20 MHz each. A spacing between the centre frequencies of the radio frequency spectrums may have a value of 25 MHz. Therefore, the radio frequency spectrums used for transmitting the measurement signals do not influence each other adversely.

According to another embodiment of the present invention, the first measurement signal is transmitted during a first time interval and the second measurement signal is transmitted during a second time interval. The first time interval is time-wise separated from the second time interval. For example, each measurement signal may be transmitted via a separate channel of for example a WLAN transmission scheme. When the first time interval is time-wise separated from the second time interval, only one channel of the WLAN transmission scheme is occupied by the Measurement signals at any time. Therefore, data transmissions between devices using the WLAN transmission scheme are only insignificantly influenced by the transmission of the measurement signals.

According to yet another embodiment of the present invention, a temporal sequence order in which the plurality of measurement signals are to be transmitted from the first device to the second device is defined. The step of wirelessly transmitting the plurality of measurement signals from the first device to the second device comprises a repeated transmission of the plurality of measurement signals from the first device to the second device in the defined temporal sequence order. The temporal sequence order may comprise for example a list of channels of a WLAN or 3GPP transmission scheme, for example a list of five channels. For performing a fine time measurement or an angle of arrival/departure measurement, measurement signals may be transmitted subsequently via the channels defined in the temporal sequence order. Only one channel is occupied at any time thus avoiding a significant disturbance of the data traffic in for example the WLAN transmission technology. However, the five channels defined in the temporal sequence order may cover a large part of the available frequency spectrum of for example the WLAN transmission technology, and therefore, the fine time measurements and the angle of arrival/departure measurements may achieve a similar precision as if one very wide band spectrum had been used. For determining the relative position based on the five measurement signals, all received measurements may be combined to increase the precision and cancel effects of variations and interference. However, the number of five channels is only an example and any other number of the channels above one channel may be used.

According to another embodiment, a Doppler spread information of a received measurement signal of the plurality of measurement signals is determined at the second device. The determined Doppler spread information is transmitted to the first device. The Doppler spread information is related to the radio frequency spectrum of the received document signal. A Doppler spread may occur due to at least one of the first and second device being moving during transmitting the measurement signal from the first device to the second device. Upon receiving the Doppler spread information from the second device at the first device, this information may be used at the first device to re-select radio frequency spectrums to be used for transmitting the measurement signals and a temporal sequence order in which the measurement signals are transmitted from the first device to the second device. For example, based on the received Doppler spread information, a time duration may be determined during which measurement signals will be sent in the future to the second device by using the radio frequency to which the Doppler spread information is related. Furthermore, based on the received Doppler spread information, it may be determined, if the radio frequency spectrum to which the Doppler spread information is related will be used at all for sending measurement signals to the second device. The Doppler spread may have different influence on the different radio frequency spectrums. For example, a good or low Doppler spread value may enable a longer channel coherence time, i.e., the radio frequency channel is less likely to change quickly and there is more time for using this radio frequency channel or this radio frequency spectrum for transmitting measurement signals.

In some embodiments of the present invention, determining the relative position based on at least the first and second measurement signals comprises determining a distance between the first device and the second device based on a time information comprised in at least the first and second measurement signals. Additionally, or as an alternative, determining the relative position comprises determining a direction in which the first device is located with respect to the second device based on a time information comprised in at least the first and second measurement signals. The time information comprised in the received measurement signals may be used in connection with a fine time measurement to determine the time it takes for radio waves to propagate from the first device to the second device. Based on the speed of the radio waves and the time it takes to propagate, the distance between the first device and the second device may be determined. Furthermore, by using multiple antennas or a synthetic array of antennas, the arrival time of the measurement signals at each antenna may be compared to determine a direction to the sender of the measurement signals with respect to a reference system of the receiving device.

In some embodiments of the present invention, each corresponding radio frequency spectrum corresponds to a radio frequency spectrum of a correspond-channel of a same wireless transmission standard. For example, each corresponding radio frequency spectrum may correspond to a radio frequency spectrum of a corresponding channel of an IEEE802.11 transmission standard. In another embodiment, each corresponding radio frequency spectrum corresponds to a radio frequency spectrum of a corresponding channel of a 3GPP wireless transmission standard. Each channel may comprise only a narrow radio frequency spectrum, having for example a bandwidth of 20 MHz, 40 MHz Or 80 MHz. However, the whole bandwidth over which the channels of the same wireless transmission standard, for example IEEE802.11 or 3GPP, are distributed may comprise a wide radio frequency spectrum of for example 1000 MHz.

By using a plurality of channels of the wireless transmission standard, a virtual high bandwidth may be used for improving positioning accuracy.

According to another embodiment, a channel selection is determined which indicates a list of a plurality of channels of the wireless transmission standard. Each channel of the plurality of channels of the list is to be used in the order indicated by the list for a transmission of corresponding measurement signals.

The cannel selection is at least partly transmitted in reserved fields of a parameter field defined in the wireless transmission standard, for example in a fine timing measurement parameter field defined in IEEE802.11 or a neighbour awareness networking service discovery frame defined in IEEE802.11. After transmitting the channel selection for example from the first device to the second device, the second device may scan the channels which are used by the first device for transmitting the measurement signals. Furthermore, by synchronizing a switching or hopping between the channels of the list in the first device and the second device, an efficient transmission of the measurement signals may be realized.

According to another embodiment, a channel selection algorithm is selected from a predefined set of a channel selection algorithms. The channel selection algorithms may be predefined in the first device as well as in the second device. A channel selection algorithm may indicate for example a predefined list of a plurality of channels of the wireless transmission standard, wherein each channel of the list is to be used in the order of the list for a transmission of the corresponding measurement signals. Additionally, or as an alternative, a channel selection algorithm may be configured to generate such a list of a plurality of channels of the wireless transmission standard. The channel selection algorithm may furthermore comprise parameters for selecting a timing for each of the plurality of channels indicating a length for using a specific channel before hopping to a next channel. An information indicating the selected channel selection algorithm and additional parameters are transmitted at least partly in reserved fields of a parameter field defined in the wireless transmission standard. Thus, a flexible and efficient channel selection for transmitting measurement signals may be adjusted in the first device and communicated to the second device or may be negotiated between the first device and the second device. By transmitting the channel selection and/or the channel selection algorithm in reserved fields of a parameter field this information can be exchanged in a compatible way to existing standardized parameter fields.

According to another aspect of the present invention, a device is provided which comprises a receiver unit and a processing unit. The receiver unit is configured to wirelessly receive a plurality of measurement signals from another device. Each measurement signal of the plurality of measurement signals is associated with a corresponding radio frequency spectrum, in which the measurement signal is received. A first radio frequency spectrum associated with a first measurement signal of the plurality of measurement signals has a different frequency range than a second radio frequency spectrum associated with a second measurement signal of the plurality of measurement signals. The processing unit is configured to determine a relative position between the device and the Other device based on the received at least first and second measurement signals. Therefore, the device is configured to perform the above described embodiments of the method for determining a relative position between a first device and a second device when acting as the second device.

Furthermore, according to the present invention, a device comprising a transmitter unit is provided. The transmitter unit is configured to wirelessly transmit a plurality of measurement signals. Each measurement signal of the plurality of measurement signals is associated with a corresponding radio frequency spectrum, in which the measurement signal is transmitted. A first radio frequency spectrum associated with a first measurement signal of the plurality of the measurement signals has a different frequency range than a second radio frequency spectrum associated with a second measurement signal of the plurality of measurement signals. The measurement signals are configured such that another device receiving the plurality of measurement signals can determine a relative position between the other device and the device based on at least the received first and second measurement signals. Therefore, the device is configured to perform the embodiments of the above described method when acting as the first device.

The above described devices, in particular, the first device and the second device, may comprise for example a mobile telephone, a tablet computer, a notebook computer, a camera, a mobile navigation system or a mobile media player. Furthermore, the devices may comprise a base station or an access point for a telecommunication network and a wireless local area network, respectively. In particular, a device may comprise the functionality of both of the above described devices and may therefore act as the first device as well as the second device of the above described embodiments of the method.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

Embodiments of the present invention will be described in more detail with reference to the accompanying drawing.

DETAILED DESCRIPTION OF PREFERRED EMBODIMENTS

In the following, exemplary embodiments of the present invention will be described in more detail.

It has to be understood that the features of the various exemplary embodiments described herein may be combined with each other unless specifically noted otherwise.

Same reference signs in the various drawings refer to similar or identical components. Any coupling between components or devices shown in the figures may be a direct or indirect coupling unless specifically noted otherwise.

Figure 1:
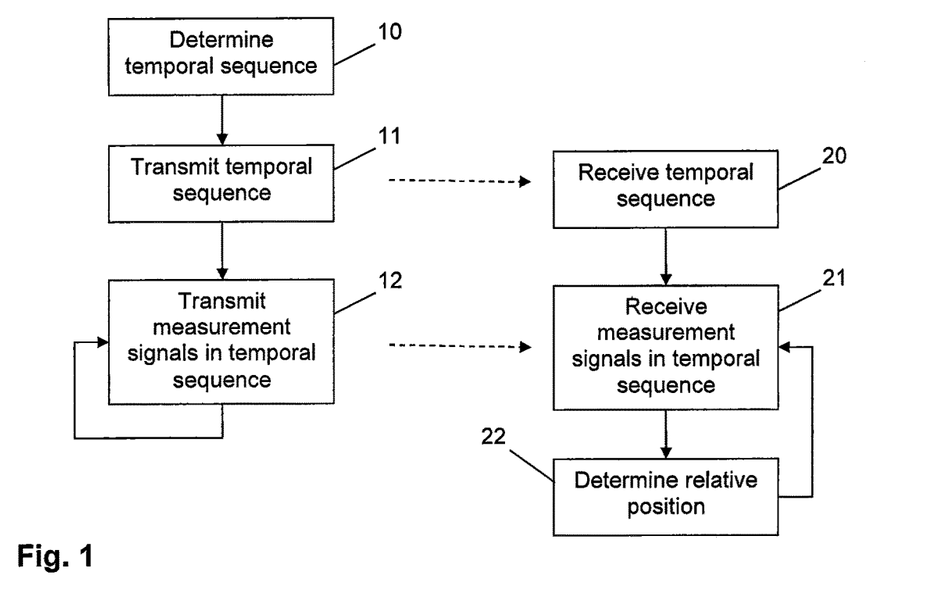
FIG. 1 shows a flow chart comprising method steps of a method according to an embodiment of the present invention.

FIG. 1 shows schematically method steps according to an embodiment of the present invention for determining a relative position between a first device and a second device. The method steps shown on the left hand side are executed by the first device, and the method steps shown on the right hand side are executed by the second device.

For determining the relative position between the first device and the second device, so called "fine timing measurements (FTM)" may be used to determine the distance between the first device and the second device. Fine timing measurements rely on measuring the time it takes for radio waves to propagate between the two devices. Additionally, for determining the relative position between the first device and the second device, a measurement of an angle of arrival/departure (AoA/AoD) may be performed. For example, multiple antennas or a synthetic array of antennas may be used at one device to receive measurement signals from another device and to determine the direction from which the measurement signals are received by comparing the times when the measurement signals arrive at each antenna. The accuracy of FTM and AoA/AoD significantly depends on the used transmission bandwidth of the measurement signals. However, the bandwidth for transmitting measurement signals may be restricted. For example in a WLAN/Wi-Fi the bandwidth of a measurement signal may be restricted to the bandwidth of a channel defined in corresponding standard, for example 20 MHz channels. For increasing positioning accuracy, measurement signals are sampled in a range of narrow channels, but in different parts of a wide spectrum. For example, measurement signals are transmitted on a series of channels in a specific, pseudo random or linear manner.

As shown in FIG. 1, the first device may define a temporal sequence order in which a plurality of measurement signals are to be transmitted from the first device to the second device (step 10). In step 11, the temporal sequence order may be transmitted to the second device and received in step 20 by the second device. For example, the temporal sequence order may comprise a list of channels to be used for transmitting the measurement signals. However, instead of transmitting the temporal sequence order from the first device to the second device, the first device and second device may negotiate in any appropriate manner a sequence order of channels to be used for the transmission of measurement signals, for example by selecting an algorithm which creates a channel list or by negotiating parameters for such an algorithm. Next, in step 12, the first device transmits a plurality of measurement signals in the temporal sequence order. In step 21, the transmitted measurement signals are received in the negotiated temporal sequence order at the second device, and in step 22, the relative position between the first device and the second device is determined in the second device based on the received measurement signals. In the first device, the plurality of measurement signals are repeatedly transmitted in the temporal sequence order such that the step 12 is repeated again and again. However, the temporal sequence order may be changed at any time, for example due to a changing environment or based on changing radio transmission characteristics between the first device and the second device, for example a change of a Doppler spread of the transmitted measurement signals. In the second device, the steps 21 and 22 are repeated for determining a current relative position between the first device and the second device.

Figure 2:
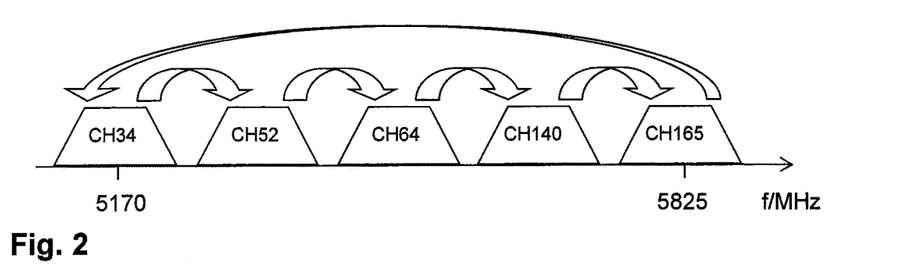
FIG. 2 shows schematically a channel selection of five channels according to an embodiment of the present invention.

FIG. 2 shows an example of five channels which may be defined in any appropriate communication standard, for example in a WLAN communication standard. Each channel may cover a small radio frequency spectrum of for example 20 MHz. The channels are subsequently used to transmit measurement signals configured to be used in connection with the fine timing measurement or an angle of arrival measurement. In the example shown in FIG. 2, a first channel 34 is used for transmitting a first measurement signal. A centre frequency of channel 34 may have a frequency of 5170 MHz. Next, a second channel 52 is used for transmitting a second measurement signal and then a third channel 64 followed by a fourth channel 140 and followed by a fifth channel 165 are used for transmitting corresponding third to fifth Measurement signals. A centre frequency of channel 165 may have a value of 5825 MHz. After a measurement signal has been transmitted in channel 165, channel 34 is used again for transmitting a measurement signal and this channel hopping is performed again and again. As can be seen, the frequency range covered between channel 34 and channel 165 may be in a range of some 100 MHz and may therefore cover the whole or a large part of the available spectrum defined for the channels in the corresponding communication standard. This achieves a similar ranging precision as if one very wide band channel had been used. All measurements are combined to increase precision and cancel effects of variations and interference. The intermediate channels 52, 64 and 140 are only a proposal and any appropriate channels available according to the communication standard and any other number of channels may be used by the method for determining the relative position between two devices.

Figure 3:
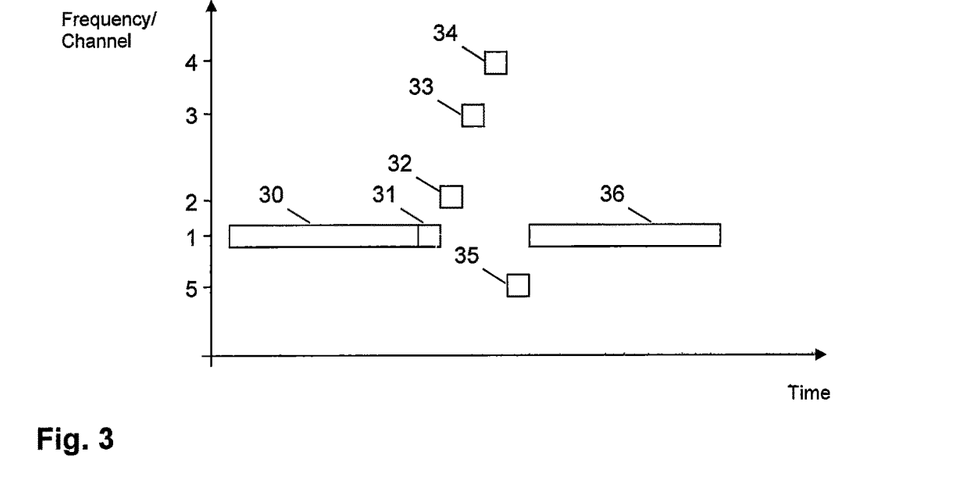
FIG. 3 shows schematically a sampling of five channels over time according to an embodiment of the present invention.

FIG. 3 shows the channels usage over time. First, a communication, for example a data or voice communication, is transmitted over channel no. 1 as indicated by block 30.

Then, five measurement signals are transmitted on different channels for determining a relative position between two devices. A first measurement signal is transmitted on channel no. 1 as indicated by block 31. Then, a measurement signal is transmitted on a channel no. 2 as indicated by block 32. After that, a further measurement signal is transmitted on channel no. 3 as indicated by block 33 and after that a further measurement signal is transmitted on channel no. 4 as indicated by block 34. Finally, a measurement signal is transmitted on channel 5 as indicated by block 35. After the transmission of these five measurement signals, the other communication, for example data and voice communication, continues as indicated by block 36.

It may be beneficial to have knowledge about the radio frequency environment in order to determine the best channels for transmitting the measurement signals and to determine an allowed duration of the transmission of measurement signals via the corresponding channel. For example, a Doppler spread may be considered. A good or low Doppler spread value means a longer channel coherence in time and it may be less likely that characteristics of the radio frequency channel changes quickly. Therefore, a channel having a low Doppler spread may be used for a longer time for transmitting measurement signals than a channel having a high Doppler spread. Doppler spread values may be determined at each device receiving measurement signals or other payload signals, and may be communicated to other devices for assisting a channel selection algorithm.

Figure 4:
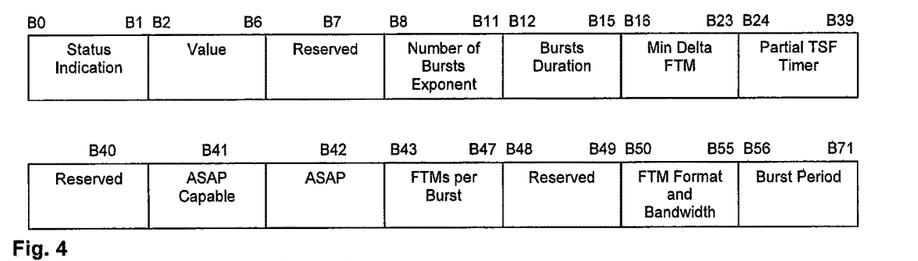
FIG. 4 shows a fine timing measurement parameters field format.

The method described above in connection with FIG. 1 may be applied to a wireless local area network (WLAN) as specified in 802.11 by IEEE. Currently, in the IEEE standard, fine timing measurements are executed following the parameters defined for example in IEEE802.11-REVmc/D4.0. The format of the fine timing measurement parameters field is shown in FIG. 4 (fine timing measurement parameters field format). According to the currently defined standard, only the channel which is currently selected for a payload communication is used for transmitting fine timing measurement signals. For implementing the above described method, a single signalling bit may be used to indicate a static or flexible channel selection for transmitting measurement signals, so called measurement bursts. One of the currently unused reserved bits may be used for this purpose, for example bit 7 (B7) or bit 40 (B40). A number and duration of measurement bursts is already defined by the present respective signalling fields, i.e., B8-B11 number of bursts exponent, B12-1315 burst duration and B43-47 FTMs per burst. If for example in B7 or B40 is indicated that the channel selection is flexible, bits 48-55 (B48-B55) may be used to identify the selected channels or to transmit parameters for a channel selection algorithm. The six bits B50-B55 of the FTM format and bandwidth field currently indicate a bandwidth of a FTM channel (5,10, 20, 40, 80 or 160 MHz), but this information is not required when the channel selection is flexible, as in this flexible channel selection mode only channels having a narrow bandwidth of for example 20 MHz are used. Some compression may be required to use bits 48-55 to indicate multiple channels or parameters for a channel selection algorithm. Furthermore, Doppler spread figures may be exchanged between two devices in for example the fine timing measurement parameters field.

Figure 5:
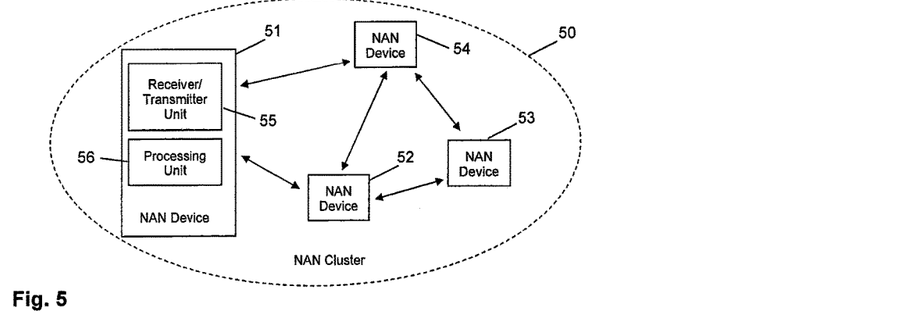
FIG. 5 shows a plurality of devices according to embodiments of the present invention arranged in a neighbour awareness networking cluster.
Figure 6:
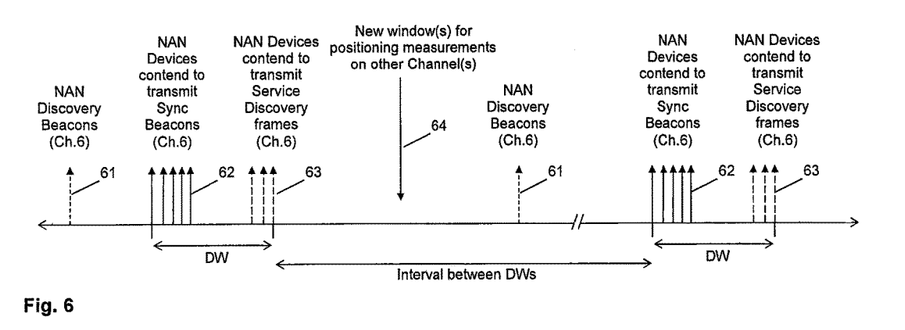
FIG. 6 shows schematically a timing diagram of discovery windows and windows for positioning measurements according to embodiments of the present invention.

The above described method for determining a relative position between two devices will be described in more detail with reference to FIGS. 5 and 6 in connection with a Wi-Fi aware technology with the technical name "neighbour awareness networking" (NAN). FIG. 5 shows a group of devices capable for supporting the neighbour awareness networking technology. A group of such devices is called a NAN cluster. Each device may comprise for example a mobile device, in particular for example a mobile communication device like a mobile telephone or smartphone. However, each NAN device may comprise a stationary user device, for example a personal computer, or an infrastructure device, for example an access point of a wireless local area network or a base station of a cellular telecommunication network.

In the NAN cluster shown in FIG. 5 four NAN devices 51-54 are shown. As shown in detail in connection with NAN device 51, each NAN device 51-54 comprises a receiver/transmitter unit 55 and a processing unit 56. Each NAN device 51-54 in the NAN cluster 50 regularly transmits NAN synchronization beacons and service discovery frames on a fixed channel as indicated in FIG. 6. In the example shown in FIG. 6, the NAN discovery beacons 61, the synchronization beacons 62 and the service discovery frames 63 are transmitted on channel No. 6. An indication may be added to the service discovery frames 63 indicating that transmissions of positioning measurement signals will follow on other channels. Accordingly, new windows for positioning measurements may be transmitted in an interval between discovery windows (DW) on other channels comprising measurement signals for determining a relative position between devices of the NAN cluster. Optionally, a list of channels or a channel selection algorithm may be defined and parameters of the list of channels or the channel selection algorithm may be transmitted within the service discovery frames. When devices are interested in finding each other's position, they may run a series of measurements on the identified channels. Furthermore, Doppler spread figures may be exchanged between the two devices in for example the service discovery frames or any other appropriate frame or window. Although in FIG. 6 only one new window for positioning measurements on another channel is shown by reference sign 64, a plurality of new windows on a plurality of other channels may be transmitted in the interval between the discovery windows.

In detail, the receiver/transmitter unit 55 of the NAN device 51 transmits a plurality of measurement signals, wherein each measurement signal of the plurality of measurement signals is associated with a corresponding radio frequency spectrum, in which the measurement signal is transmitted. The radio frequency spectrum is associated with a corresponding channel of a communication standard according to which the NAN device is working. The radio frequency spectrums to which the measurement signals are associated have different frequency ranges. In other words, at least a first radio frequency spectrum associated with a first measurement signal of the plurality of measurement signals has a different frequency range than a second radio frequency spectrum associated with a second measurement signal of the plurality of measurement signals. The measurement signals are configured such that another NAN device, for example a NAN device 54, which receives the plurality of measurement signals, may determine a relative position between the NAN device 51 and the NAN device 54 based on the received measurement signals. Vice versa, a corresponding receiver/transmitter unit in any other NAN device, for example NAN device 54, is configured to wirelessly transmit a plurality of measurement signals in a plurality of radio frequency spectrums or channels. Therefore, the receiver/transmitter unit 54 of the NAN device 51 is configured to wirelessly receive the plurality of measurement signals from the other device, for example for NAN device 54. Each received measurement signal of the plurality of measurement signals is associated with a corresponding radio frequency spectrum and is therefore associated with a corresponding channel, in which the measurement signal is received. The processing unit 56 determines a relative position between the NAN device 51 and the other NAN device 54 based on the received measure Ment signals.

The invention claimed is:

1. A method for determining a relative position between a first device and a second device, the method comprising:
   determining a channel selection indicating a list of a plurality of channels of a wireless transmission standard, wherein each channel of the plurality of channels of the list is to be used in the order of the list for a transmission of corresponding measurement signals;
   transmitting the channel selection at least partly in reserved fields of a parameter field defined in the wireless transmission standard;
   wirelessly transmitting a plurality of measurement signals from the first device to the second device, wherein each measurement signal of the plurality of measurement signals is associated with a corresponding radio frequency spectrum, in which the measurement signal is transmitted, wherein a first radio frequency spectrum associated with a first measurement signal of the plurality of measurement signals has a different frequency range than a second radio frequency spectrum associated with a second measurement signal of the plurality of measurement signals; and
   determining, at the second device, the relative position based on at least the first and second measurement signals,
   wherein each corresponding radio frequency spectrum corresponds to a radio frequency spectrum of a corresponding channel of the wireless transmission standard.

2. The method according to claim 1, wherein the first radio frequency spectrum is frequency-wise separated from the second radio frequency spectrum.

3. The method according to claim 1, wherein the first measurement signal is transmitted during a first time interval and the second measurement signal is transmitted during a second time interval, the first time interval being time-wise separated from the second time interval.

4. The method according to claim 1, the method further comprising:
   defining a temporal sequence order in which the plurality of measurement signals are to be transmitted from the first device to the second device,
   wherein the wirelessly transmitting the plurality of measurement signals from the first device to the second device comprises:
   repeatedly transmitting the plurality of measurement signals from the first device to the second device in the defined temporal sequence order.

5. The method according to claim 1, wherein determining the relative position based on at least the first and second measurement signals comprises at least one of:
   determining a distance between the first device and the second device based on a time information comprised in at least the first and second measurement signals, or
   determining a direction in which the first device is located with respect to the second device based on a time information comprised in at least the first and second measurement signals.

6. A method for determining a relative position between a first device and a second device, the method comprising:

selecting a channel selection algorithm from a predefined set of channel selection algorithms, wherein each channel selection algorithm is configured to generate a list of a plurality of channels of a wireless transmission standard, wherein each channel of the list is to be used in the order of the list for a transmission of corresponding measurement signals; and transmitting an information indicating the selected channel selection algorithm at least partly in reserved fields of a parameter field defined in the wireless transmission standard;

wirelessly transmitting a plurality of measurement signals from the first device to the second device, wherein each measurement signal of the plurality of measurement signals is associated with a corresponding radio frequency spectrum, in which the measurement signal is transmitted, wherein a first radio frequency spectrum associated with a first measurement signal of the plurality of measurement signals has a different frequency range than a second radio frequency spectrum associated with a second measurement signal of the plurality of measurement signals; and determining, at the second device, the relative position based on at least the first and second measurement signals, wherein each corresponding radio frequency spectrum corresponds to a radio frequency spectrum of a corresponding channel of the wireless transmission standard.

7. A device, comprising:

a processor configured to generate a predefined set of channel selection algorithms, wherein each channel selection algorithm is configured to generate a plurality of channels of a wireless transmission standard, wherein each channel of the list is to be used in the order of the list for a transmission of corresponding measurement signals, and a receiver configured to wirelessly receive a plurality of measurement signals from an other device, wherein each measurement signal of the plurality of measurement signals is associated with a corresponding radio frequency spectrum, in which the measurement signal is received, wherein a first radio frequency spectrum associated with a first measurement signal of the plurality of measurement signals has a different frequency range than a second radio frequency spectrum associated with a second measurement signal of the plurality of measurement signals, wherein the processor is configured to determine a relative position between the device and the other device based on at least the received first and second measurement signals and select a channel selection algorithm from the predefined set of channel selection algorithms, wherein each corresponding radio frequency spectrum corresponds to a radio frequency spectrum of a corresponding channel of the wireless transmission standard.

8. A device, comprising:

a processor configured to determine a channel selection indicating a list of a plurality of channels of a wireless transmission standard, wherein each channel of the plurality of channels of the list is to be used in the order of the list for a transmission of corresponding measurement signals, a transmitter configured to transmit the channel selection at least partly in reserved fields of a parameter field defined in the wireless transmission standard, wherein the processor is further configured to generate a plurality of measurement signals; and wherein the transmitter is further configured to wirelessly transmit the plurality of measurement signals, wherein each measurement signal of the plurality of measurement signals is associated with a corresponding radio frequency spectrum, in which the measurement signal is transmitted, wherein a first radio frequency spectrum associated with a first measurement signal of the plurality of measurement signals has a different frequency range than a second radio frequency spectrum associated with a second measurement signal of the plurality of measurement signals, wherein the measurement signals are configured such that an other device receiving the plurality of measuring signals can determine a relative position between the other device and the device based on at least the received first and second measurement signals, wherein each corresponding radio frequency spectrum corresponds to a radio frequency spectrum of a corresponding channel of the wireless transmission standard.

9. The device according to claim 7, wherein the device comprises at least one of
a mobile telephone,
a tablet computer,
a notebook computer,
a camera,
a mobile navigation system,
a mobile media player,
an access point, or
a base station.

10. The device according to claim 8, wherein the device comprises at least one of:
a mobile telephone,
a tablet computer,
a notebook computer,
a camera,
a mobile navigation system,
a mobile media player,
an access point, or
a base station.

* * * * *